United States Patent [19] [11] 4,412,949
Dimroth et al. [45] Nov. 1, 1983

[54] PIGMENTS COMPRISING CYANOMETHYLQUINAZOLONES COUPLED TO DIAZO COMPOUNDS PREPARED FROM 1-AMINOANTHROQUINONES

[75] Inventors: Peter Dimroth, Mannheim; Wolfgang Lotsch, Beindersheim, both of Fed. Rep. of Germany

[73] Assignee: BASF Aktiengesellschaft, Rheinland-Pfalz, Fed. Rep. of Germany

[21] Appl. No.: 279,542

[22] Filed: Jul. 1, 1981

[30] Foreign Application Priority Data

Jul. 2, 1980 [DE] Fed. Rep. of Germany ....... 3024957

[51] Int. Cl.$^3$ .................. C09B 6/00; C09B 29/52; C09D 3/48; C09D 11/02
[52] U.S. Cl. ..................... 260/154; 106/23; 106/288 Q; 106/308 M; 106/308 Q; 260/373; 260/377; 260/378; 260/380; 260/381; 544/287
[58] Field of Search .......................... 260/154

[56] References Cited

U.S. PATENT DOCUMENTS 3,331,831  7/1967  Raue et al. ............ 260/162
3,923,774  12/1975  Dimoth ................. 260/154
4,052,371  10/1977  Junge et al. ........... 260/154
4,052,377  10/1977  Junge et al. ........... 260/154

FOREIGN PATENT DOCUMENTS 2819570  11/1979  Fed. Rep. of Germany ...... 260/154
2830555  3/1980  Fed. Rep. of Germany ...... 260/154
47-31405  8/1972  Japan ........................... 260/154
47-31926  8/1972  Japan ........................... 260/154
48-19871  3/1973  Japan ........................... 260/154
49-71266  10/1974  Japan ........................... 260/154
2017097  10/1979  United Kingdom ............. 260/154

Primary Examiner—Floyd D. Higel
Attorney, Agent, or Firm—Oblon, Fisher, Spivak, McClelland & Maier

[57] ABSTRACT

A pigment of the formula:

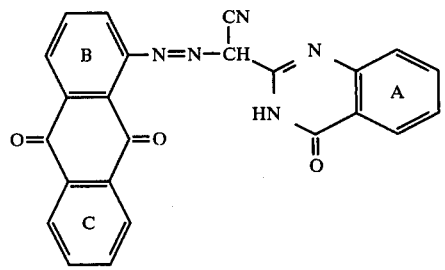

wherein each of the rings A, B and C independently is unsubstituted or is substituted by one, two or three radicals which do not confer solubility, or the ring A can additionally carry a fused ring. The novel compounds of the invention are useful as pigments for coloring, printing inks, plastics, and, especially, surface coatings.

3 Claims, No Drawings

PIGMENTS COMPRISING CYANOMETHYLQUINAZOLONES COUPLED TO DIAZO COMPOUNDS PREPARED FROM 1-AMINOANTHROQUINONES

The present invention relates to compounds of the general formula I

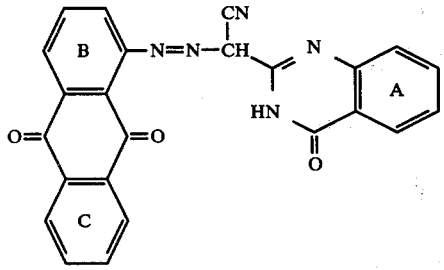

where the rings A, B and C can be substituted by one, two or three radicals which do not confer solubility, and the ring A can additionally carry a fused ring.

Examples of substituents which do not confer solubility are halogens, alkyl and alkoxy of 1 to 6 carbon atoms, nitro, trifluoromethyl, carbamyl, ureido, sulfamyl and cyano, alkoxycarbonyl, alkanoyl, alkylcarbamyl, alkylureido and alkanoylamino of 2 to 6 carbon atoms, alkylsulfonyl and alkylsulfamyl of 1 to 6 carbon atoms, aryloxycarbonyl, aroyl, arylsulfonyl, arylcarbamyl, arylsulfamyl, aryl, aryloxy, thioaryloxy, arylureido and arylazo, fused 5-membered or 6-membered hetero-rings containing a

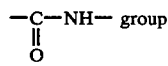

in the ring, and fused 5-membered and 6-membered aromatic rings.

Preferred radicals which do not confer solubility are chlorine, bromine, methyl, methoxy and phenoxy.

The substituents are preferably present in rings B and C.

The compounds of the formula I are yellow to orange and, because of their insolubility, can be used as pigments for coloring printing inks, surface coatings and plastics. Some of the compounds possess excellent lightfastness and fastness to weathering, other good fastness characteristics, and good color strength.

The compounds of the formula I can be prepared by reacting a diazo compound of an amine of the formula II

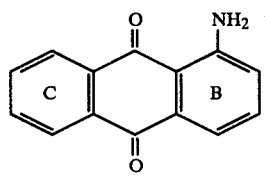

with a coupling component of the formula III

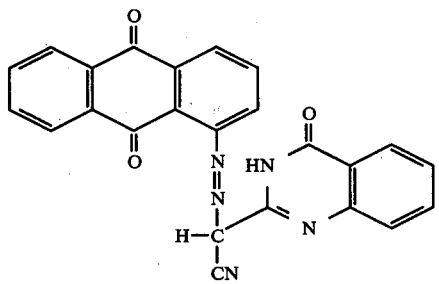

The diazotization and coupling can be carried out in a conventional manner; details may be found in the Examples, where parts and percentages are by weight, unless stated otherwise.

EXAMPLE 1

22.4 parts of 1-aminoanthraquinone are introduced into a mixture of 46 parts of 96% strength sulfuric acid and 34 parts of 40% strength nitrosylsulfuric acid at a rate such that the temperature does not rise above 40° C. The solution is then stirred for two hours at 40° C., after which it is stirred into 300 parts of ice and water, and the diazonium sulfate which crystallizes out is filtered off and washed with ice water.

The moist diazonium sulfate is then stirred with 19 parts of cyanomethylquinazolone and 20 parts of pyridine in 400 parts of N-methylpyrrolidone for 12 hours at room temperature and 2 hours at 95° C. Thereafter, the product is filtered off, washed with N-methylpyrrolidone and methanol, and dried. 36 parts (86% of theory) of a yellow compound, of the formula IV, having a melting point of >360° C., are obtained.

The colorant can be used direct, in this form, for coloring surface coatings, plastics and printing inks. The colorations obtained have a pure reddish yellow hue, of excellent lightfastness and fastness to weathering. A somewhat higher-hiding pigmentary form, whose fastness to weathering is somewhat better still, is obtained by, for example, stirring 10 parts of the colorant of the formula IV in 120 parts of dimethylformamide for 3 hours at 120° C., filtering off the product, washing it with dimethylformamide and methanol, and drying it. The yield is 9.5 parts.

Pigments having similar good properties are obtained when, following a method similar to that of Example 1, the diazonium salts of the α-aminoanthraquinones shown in the Table are coupled with the cyanomethylquinazolones shown.

| Example | Diazo component | Coupling component | Hue |
|---|---|---|---|
| 2 | 1-aminoanthraquinone | 5-chloro-2-(cyanoacetamidrazono)benzamide (Cl-C6H3, C(=O)NH-N=C(CH2CN)-) | yellow |
| 3 | " | 5-bromo analog (Br-) | " |
| 4 | " | 3,5-dichloro analog | " |
| 5 | " | 5-(acetylamino) analog (CH3COHN-) | orange |
| 6 | " | 5-(benzoylamino) analog (H5C6COHN-) | " |
| 7 | 1-amino-5-benzoylaminoanthraquinone | unsubstituted benzamide analog | " |
| 8 | 1-amino-2-carboxyanthraquinone | " | yellow |
| 9 | 1-amino-2-methoxyanthraquinone | " | orange |
| 10 | 4-amino-1-methoxyanthraquinone | " | yellowish red |

-continued

| Example | Diazo component | Coupling component | Hue |
|---|---|---|---|
| 11 | 1-amino-4-bromo-2-methoxyanthraquinone | " | orange |
| 12 | 1-amino-4-chloro-2-methoxyanthraquinone | " | " |
| 13 | 1-amino-2-methoxy-4-(phenylsulfonylamino)anthraquinone | " | " |
| 14 | 1-amino-4-(phenylthio)anthraquinone | " | yellowish red |
| 15 | 1-amino-4-hydroxy-2-phenoxyanthraquinone | " | orange |
| 16 | 1-amino-4-phenoxyanthraquinone | " | yellowish red |
| 17 | 1-amino-2-methylanthraquinone | " | yellow |
| 18 | 1-amino-8-chloroanthraquinone | " | " |

| Example | Diazo component | Coupling component | Hue |
|---|---|---|---|
| 19 | 6,7-dichloro-1-amino-anthraquinone | " | " |
| 20 | 1,8-dichloro-5-amino-anthraquinone (structure shows 1,5-dichloro-8-amino) | " | " |
| 21 | 1-amino-2-carboxy-4-nitro-anthraquinone | " | " |
| 22 | 1-amino-2-ethyl-anthraquinone | " | " |
| 23 | 1-amino-anthraquinone | 3,4,5-trichloro-2-(cyanoacetamidino)-benzamide (2-cyanoacetimidoylamino-3,4,5-trichlorobenzamide) | " |
| 24 | " | 5-bromo-3-chloro analog | " |
| 25 | " | 5-chloro-3-bromo analog | " |
| 26 | " | naphthalene analog | " |

EXAMPLE 23

Use Example (a) Surface coating 10 parts of the colorant obtained in Example 1 and 95 parts of a baking finish containing 70% of coconut alkyd resin (as a 60% strength solution in xylene) and 30% of melamine resin (as an about 55% strength solution in butanol/xylene) are ground in an attrition mill. The finish is applied to a substrate and baked for 30 minutes at 120° C., giving yellow full-shade coatings having good lightfastness and fastness to overspraying.

The white reductions obtained by admixture of titanium dioxide are yellow.

If the colorants listed under Examples 2 to 22 are used, coatings having similar yellow to orange hues and similar properties are obtained.

(b) Plastic 0.5 part of the colorant obtained according to Example 1 is tumbled with 100 parts of standard polystyrene granules. The surface-colored granules are homogenized by extruding at 190°–195° C. A yellow extrudate, having good lightfastness, is obtained.

If a mixture of 0.5 part of the colorant and 1 part of titanium dioxide is used, a high-hiding yellow coloration is obtained.

If the pigments listed under Examples 2 to 22 are used, similar colorations are obtained.

(c) Printing ink 8 parts of the pigment obtained according to Example 1, 40 parts of a rosin modified with phenol/formaldehyde and 55–65 parts of toluene are thoroughly mixed in a disperser. A yellow toluene-based gravure printing ink is obtained. The prints produced with this ink have good lightfastness.

If the colorants listed under Examples 2 to 22 are used, similar results are obtained.

We claim:

1. A pigment of the formula

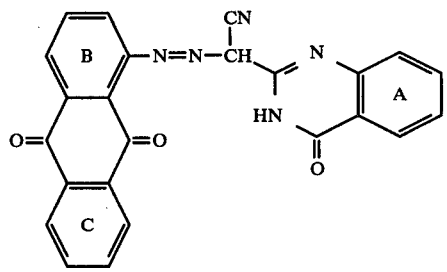

where ring A is unsubstituted or is substituted by halogen and ring B is unsubstituted or is substituted by chlorine.

2. The pigment of claim 1, wherein ring B is substituted by chlorine.

3. The pigment of claim 1 having the formula

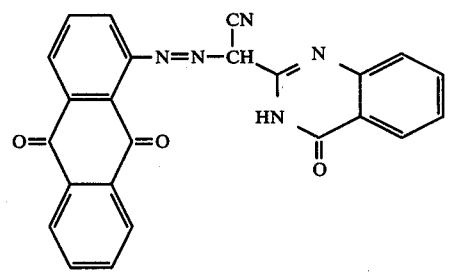

* * * * *